(12) United States Patent
Ott

(10) Patent No.: US 6,598,066 B1
(45) Date of Patent: Jul. 22, 2003

(54) FAST CARRY-OUT GENERATION

(75) Inventor: Michael L. Ott, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/577,211

(22) Filed: May 23, 2000

(51) Int. Cl.$^7$ ............................................... G06F 7/50
(52) U.S. Cl. ........................................................ 708/710
(58) Field of Search ................................. 708/710–713

(56) References Cited

U.S. PATENT DOCUMENTS

| | | | | | |
|---|---|---|---|---|---|
| 3,805,045 A | * | 4/1974 | Larsen | ........................ | 708/710 |
| 3,993,891 A | * | 11/1976 | Beck et al. | .................. | 708/710 |
| 4,504,924 A | * | 3/1985 | Cook et al. | .................. | 708/710 |
| 5,508,950 A | * | 4/1996 | Bosshart et al. | ............ | 708/525 |
| 5,508,951 A | | 4/1996 | Ishikawa | .................... | 364/745 |
| 5,539,685 A | | 7/1996 | Otaguro | ....................... | 364/757 |
| 5,943,251 A | * | 8/1999 | Jiang et al. | .................. | 708/710 |
| 5,951,631 A | * | 9/1999 | Hwang | ......................... | 708/710 |
| 6,292,818 B1 | * | 9/2001 | Winters | ....................... | 708/671 |
| 2001/0037349 A1 | * | 11/2001 | Hayakawa | .................. | 708/211 |

* cited by examiner

*Primary Examiner*—David H. Malzahn
(74) *Attorney, Agent, or Firm*—Thelen Reid & Priest LLP; Marc S. Hanish

(57) ABSTRACT

A carry-out bit generator determines if a bit pattern from two positive numbers matches one of the patterns for which a carry-out bit would be generated in addition. These patterns include a $T^nG$ pattern and a $T^m$ pattern (with a carry-in). Superscript n represents a number between zero and m−1, superscript m represents the number of registers, T represents a 0/1 or 1/0 pair and G represents a 1/1 pair.

30 Claims, 7 Drawing Sheets

US 6,598,066 B1

FAST CARRY-OUT GENERATION

BACKGROUND OF THE INVENTION

Field of the Invention

The present invention is generally directed to a carry-out generator for addition of two positive numbers.

Background

Binary addition operates on an augend and an addend, both of which may include a series of registers having a bit of either unity (=1) or zero (=0). A full adder of two bits combines two bits to find a sum. The addition may be evaluated for a bit register of any length. A carry-in may be received from the adjacent lesser bit register, and the result may detect a carry-out to be received by the adjacent greater bit register. The full adder for bit register receives an augend input A, an addend input B, a carry-in input $C_i$. The results from the adder include a sum S and a carry-out $C_o$. FIG. 1 illustrates an adder as a block diagram featuring the inputs and outputs. The adder 10 receives an augend 12, an addend 14 and a carry-in 16. The outputs include a sum 18 and a carry-out 20.

The results S and $C_o$ depend on the input values. In FIG. 2, a logic table shows row of inputs and corresponding outputs for a bit register. The legend 22 identifies the inputs A (augend), B (addend), and $C_i$ (carry-in), along with the possible outputs S (sum) and $C_o$ (carry-out). The first four rows 24, 26, 28 and 30 are shown for no carry-in bit, while the last four rows 32, 34, 36 and 38 are shown for a carry-in bit. The carry-out propagation can be time-consuming for a processor. Various schemes to reduce the propagation time have been developed, including look-ahead carry chain.

In many applications, such as a control shift for a multiplexer or a conditional branch, only the carry-out is required. In such circumstances, calculating the addition of the augend and addend to obtain the sum bit and the cascading carry-out bit needlessly consumes processing time. A solution is desired to expedite the carry-out result without an adder.

SUMMARY OF THE INVENTION

A carry-out bit generator determines if a bit pattern from two positive numbers matches one of the patterns for which a carry-out bit would be generated in addition. These patterns include a $T^nG$ pattern and a $T^m$ pattern (with a carry-in). Superscript n represents a number between zero and m−1, superscript m represents the number of registers, T represents a 0/1 or 1/0 pair and G represents a 1/1 pair.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons having the benefit of this disclosure.

The present invention allows the carry-out bit to be generated instead of or in parallel with the sum, so that it is valid much earlier than waiting for the rest of the sum to be valid. Instead of relying on the carry-propagate chain to determine the carry-out bit, the present invention compares the two summands to identify the very specific patterns that create the carry-out bit. This enables à priori carry-out bit generation without engaging in the addition process.

Bit Pattern Identification from Gates

An augend bit and an addend bit together may exhibit a bit pattern. For the purposes of this disclosure, an augend represents a first number or binary value and an addend represents a second number or binary value. Such a bit pattern may be recognized without the need for addition or otherwise computation of a sum. For example, an augend bit A and an addend bit B may be input into three parallel gates to determine the bit pattern. An exclusive-OR or XOR gate may determine if either A or B is unity but not both. This condition may be labeled a T bit pattern. An AND gate may determine if both A and B are unity, and labeled a G bit pattern. A not-OR or NOR gate may determine if both A and B are zero, and labeled a Z bit pattern. The Z bit pattern may be alternatively determined by inverting the inputs as ¬A and ¬B into an AND gate (where ¬ represents a NOT logic inverse). The detection of selected bit patterns containing G and/or T may be used for generating a carry-out bit. The logical gates described herein do not restrict the invention to a hardware form, but are used as an explanatory tool to facilitate understanding of the pattern recognition.

Figures 1, 2:
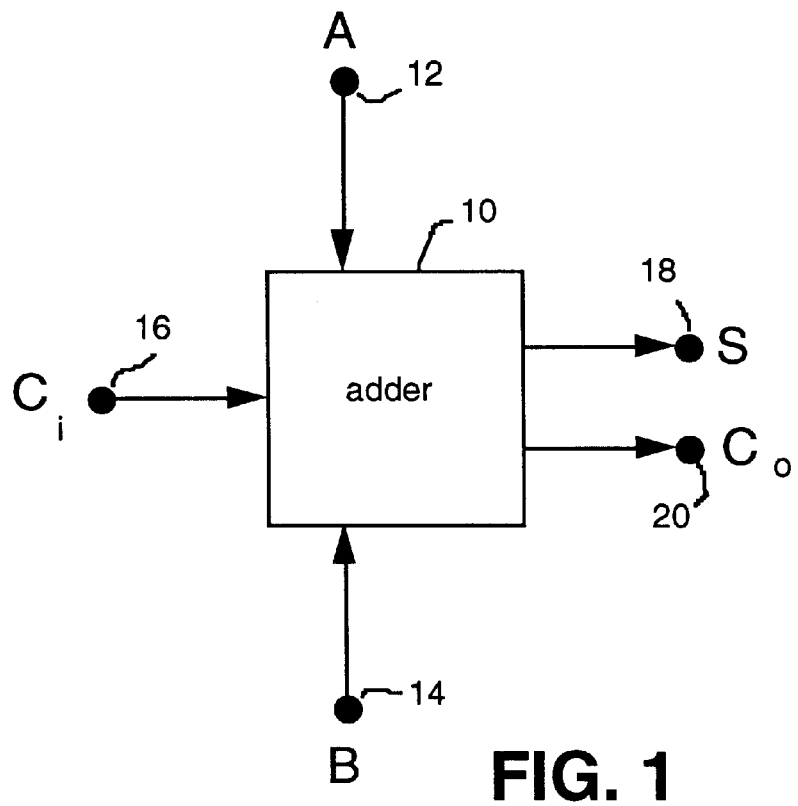
FIG. 1 is a block diagram of an adder.
FIG. 2 is a binary table for an adder.
Figures 3, 4:
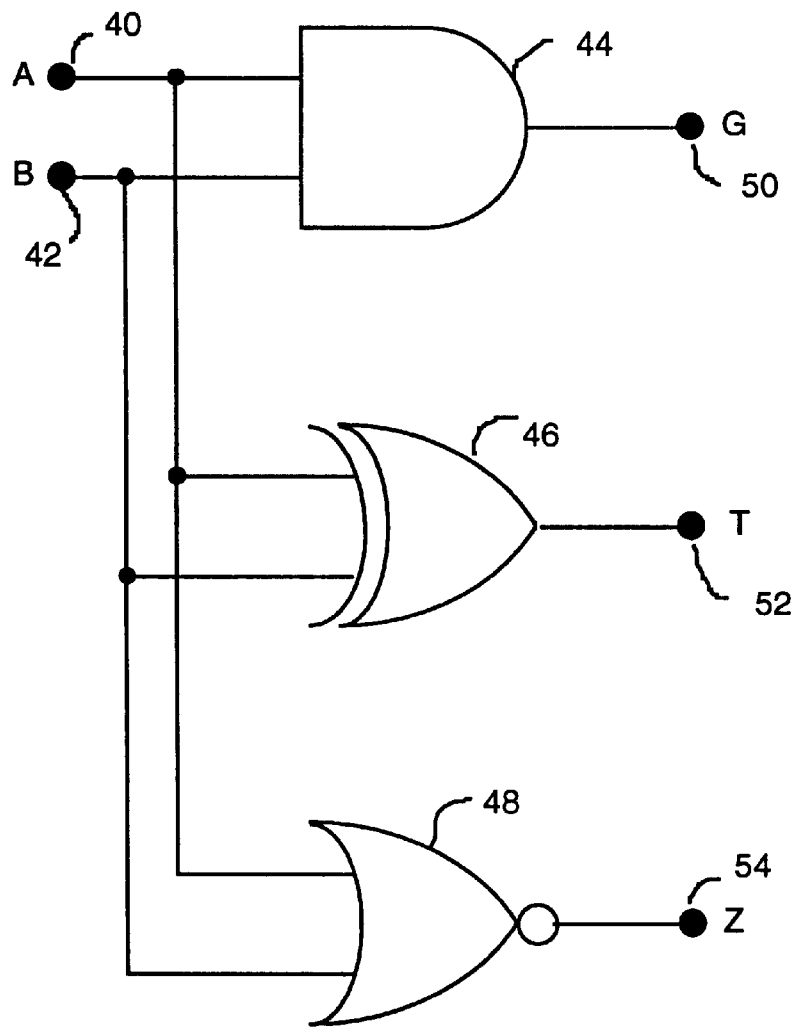
FIG. 3 is a block diagram of the logic gates to determine a bit pattern, according to a specific embodiment of the present invention.
FIG. 4 is a binary table of the logic gates to determine a bit pattern according to a specific embodiment of the present invention.

FIG. 3 illustrates this gate series for an augend and addend at a bit register. The A bit augend 40 and B bit addend 42 may be input to the AND gate 44, the XOR gate 46 and the NOR gate 48. The AND gate 44 yields a G bit pattern result 50. The XOR gate 46 yields a T bit pattern result 52. The NOR gate 48 yields a Z bit pattern result 54. One and only one of the three gates will yield a unity with the other two gates yielding zero, meaning the bit pattern may correspond to only one of the three configurations. FIG. 4 shows a logic table depending on the A/B bit pattern. The legend 56 identifies the bit pattern inputs A (augend) and B (addend), along with the gate outputs Z (NOR gate), T (XOR gate) and G (AND gate). If the bit pattern is 0/0 in the first row 58, Z=1 (or TRUE) with T and G=0 (or FALSE) indicating a Z bit pattern. If the bit pattern is 0/1 in the second row 60, T=1 (or TRUE) with Z and G=0 (or FALSE) indicating a T bit pattern. If the bit pattern is 1/0 in the third row 62, T=1 (or TRUE) with Z and G=0 (or FALSE), again indicating a T bit pattern. If the bit pattern is 1/1 in the fourth row 64, G=1 (or TRUE) with Z and T=0 (or FALSE) indicating a G bit pattern.

Selected bit patterns may yield a carry-out (i.e., $C_o$=1). In this case for a single register, a G bit pattern will create result in an overflow of that register and propagate a carry-out bit. However, a Z bit pattern produces no carry-out bit, and a T bit pattern produces a carry-out bit only if there is a carry-in bit (i.e., $C_i$=1), such as from a G bit pattern from the adjacent less significant bit. The matching of a bit pattern to these logical conditions may be used to determine whether a carry-out would be generated by an adder but without the need to perform a summation of the augend and addend.

Nibble Pattern Recognition

Figure 5A:
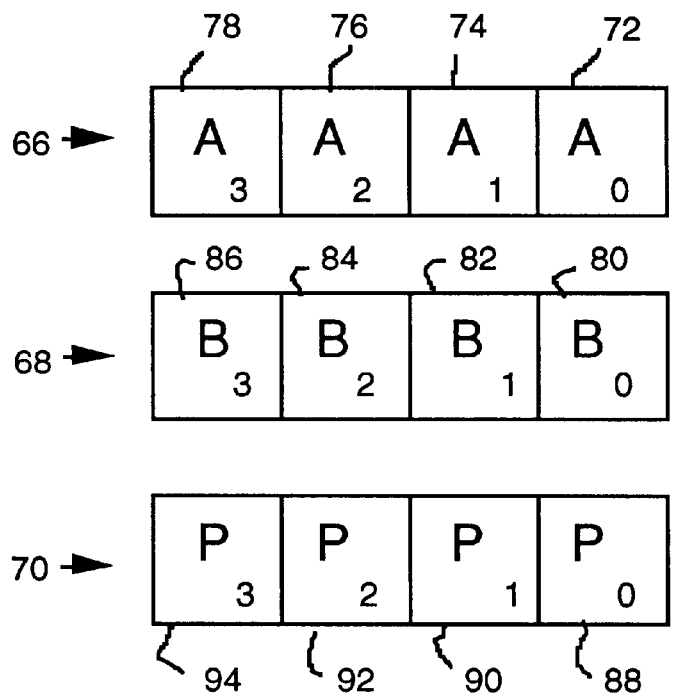
FIG. 5A is a block diagram of a four-bit nibble operation to determine a carry-out from a nibble pattern according to a specific embodiment of the present invention.

The principle may be applied to a sequence of registers, such as a four-bit nibble, by a pattern evaluation process. The total number of bit registers to be evaluated may be labeled as m for the purposes of this disclosure. FIG. 5A shows an example form of four-bit nibble pattern recognition process, so that m equals four. FIG. 5A has a first row for the augend 66 and a second row for the addend 68. Each register contains a bit having a binary value. The nibble pattern 70 is featured in the third row. The nibble $A^4$ for the first augend 66 has four registers, starting with $A_0$ the lowest or zeroth register 72, followed by $A_1$ first register 74 and $A_2$ second register 76 and ending with $A_3$ the highest or third register 78. The superscript represents the number of registers in a sequence, while the subscript represents the particular register evaluated.

The nibble $B^4$ for the first addend 68 also has four registers, starting with $B_0$ the lowest register 80, followed by $B_1$ 82 and $B_2$ 84 and ending with $B_3$ the highest register 86, each containing a bit having a bit value. The pattern registers for the $A^4/B^4$ nibble pattern 70 in the third row start with $P_0$ the lowest register 88, followed by $P_1$ 90 and $P_2$ 92 and ending with $P_3$ the highest register 94.

The four-bit nibble patterns related to this invention include particular sequences starting with the most significant bit for determining whether a pattern associated with carry-out bit generation may be recognized. These nibble pattern sequences to be recognized for two positive numbers may be labeled as a $T^nG$ transitional sequences pattern and a $T^4$ sequence pattern. The $T^nG$ transitional sequence pattern may be described as a T bit pattern of n length (with no Z bit pattern to interrupt the series) trailed by a G bit pattern (in the adjacent less significant register). For a four-bit nibble pattern, superscript n may be between zero and three. More generally n may range between zero and one less than the total number of registers (m−1). The $T^4$ sequence pattern may be described as a T bit pattern of m length, where superscript m equals four and represents number of registers denoting the four-bit nibble length.

Figure 5B:
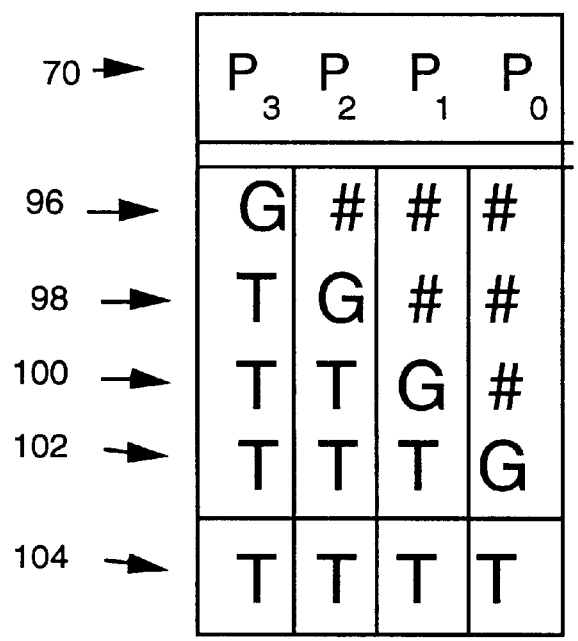
FIG. 5B is a binary table of a block diagram of a four-bit nibble operation to determine whether the nibble pattern is transitional according to a specific embodiment of the present invention.

An example in FIG. 5B for a four-bit nibble $N_0$ shows the nibble pattern 70 of interest represented by a table. The $T^nG$ transitional sequence patterns for which n may be any integer from zero to three in a four-bit nibble include G### as 96 (for n=0), TG## as 98 (for n=1), TTG# as 100 (for n=2) and TTTG as 102 (for n=3), where the symbol # represents a "don't care" pattern within the four-bit nibble. The patterns following the register having the G bit pattern may be ignored. The $T^nG$ transitional sequence pattern represents a pattern type enabling a carry-out (i.e., $C_o$=1) to be generated for the nibble. The $T^4$ sequence pattern, also denoted by TTTT as 104, represents a pattern type that enables a carry-out to be propagated through the nibble provided a carry-in equals unity. (i.e., $C_i$=1) such as a carry-out from the adjacent less significant nibble or bit. Any other pattern sequence would not be recognized for generating or propagating a carry-out for the purposes of the present invention.

Figure 6:
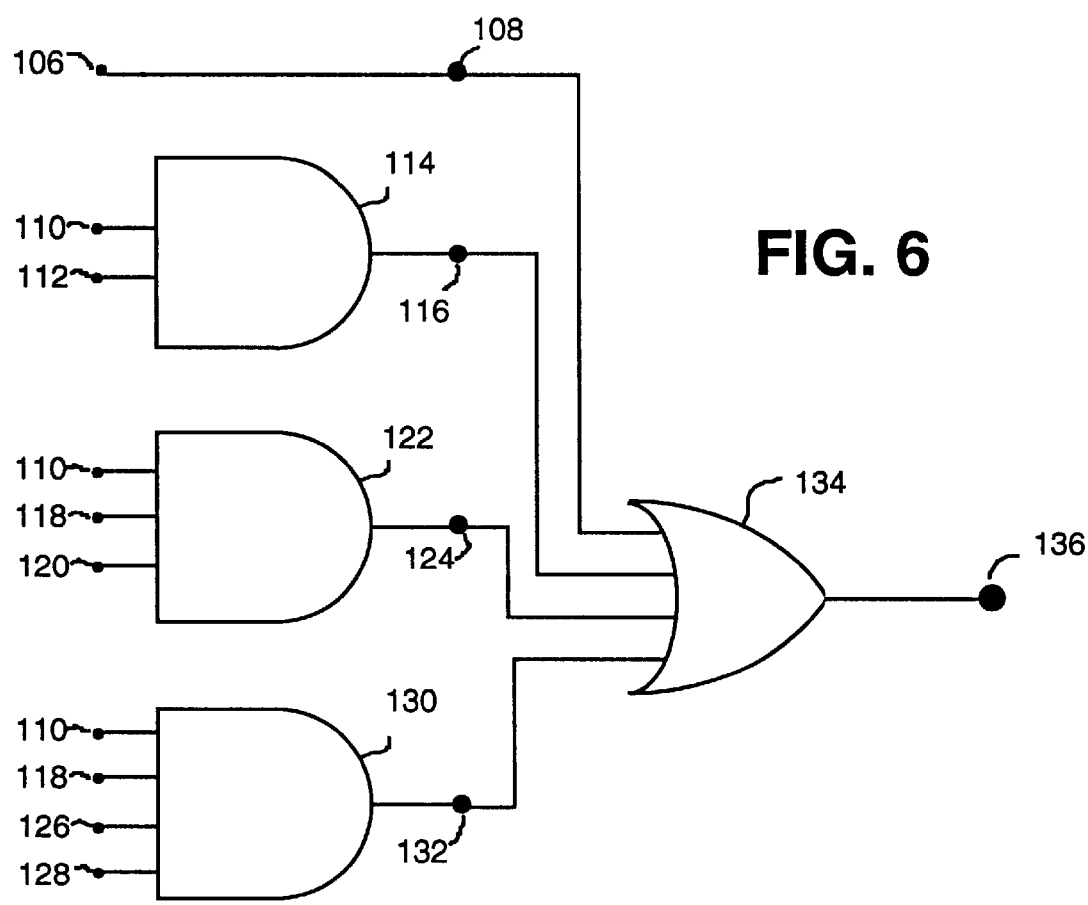
FIG. 6 is a block diagram of a four-bit nibble operation to determine whether the nibble pattern is transitional according to a specific embodiment of the present invention.

FIG. 6 illustrates a possible implementation for a $T^nG$ nibble pattern detector. The augend from $A_3$ and addend from $B_3$ as inputs at register-3 may yield a recognized $G_3$ bit pattern 106. The bit patterns for remaining registers in nibble (i.e., register-2, register-1, and register-0) need not be evaluated. This nibble pattern may be labeled G### in 108, where ### represents the "don't care" bit patterns lower than for the G bit pattern at register-3.

Alternatively, register-3 may yield a $T_3$ bit pattern 110 followed by the register-2 producing a $G_2$ bit pattern 112. These bit patterns may be input to an AND gate 114 to detect the nibble pattern may be labeled TG## as 116. Inputs at register-3 and register-2 yielding $T_3$ and $T_2$ bit patterns 110 and 118 may be preceded by input at register-1 producing a $G_1$ bit pattern 120. These inputs 110, 118 and 120 may be input to an AND gate 122 to yield the nibble pattern labeled TTG# as 124. A transitional nibble may be recognized by the $G_1$ bit pattern 120 at register-1 succeeded by the $T_3$ and $T_2$ bit patterns 110 and 118. The bit patterns for register-3, register-2 and register-1 may yield $T_3$, $T_2$ and $T_1$ as 110, 118 and 126, preceded by register-0 producing a $G_0$ bit pattern 128. These inputs 110, 118, 126 and 128 may be input to an AND gate 130 to yield a transitional nibble pattern that may be labeled TTTG as 132.

The results G### as 108, TG## as 116, TTG# as 124, or TTTG as 132 may be input to an OR gate 134 for a nibble result 136. A nibble pattern being recognized as conforming to any of these conditions may be denoted as a $T^nG$ transitional nibble.

Extending to a 32-bit Word

For a series of registers (e.g., in a thirty-two-bit word), the patterns from each augend and addend register input may be evaluated together. The patterns may be evaluated from a series of individual registers to identify T and G bit patterns therein or from a nibble pattern series represented by $N_7$, $N_6$, ..., $N_1$, $N_0$. Each nibble pattern may contain a four-bit sequence as described above. Within a thirty-two-bit word, the nibble patterns may be concatenated.

Figure 7:
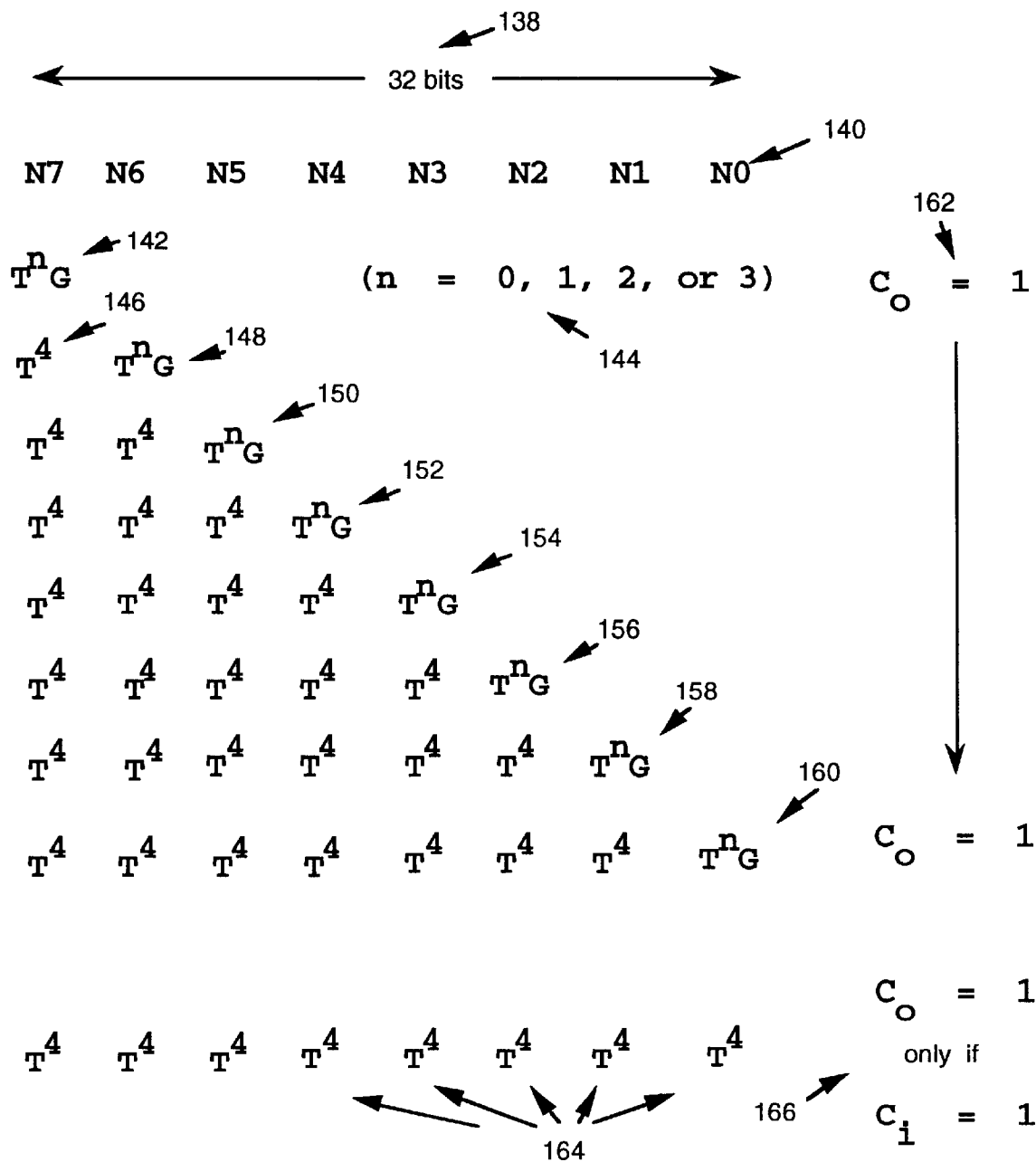
FIG. 7 is a block diagram of a 32-bit operation to determine a carry-out from several possible four-bit nibble patterns according to a specific embodiment of the present invention.

A word pattern may be subdivided into nibbles each with four-bit patterns, as shown in FIG. 7 for a thirty-two-bit word 138. A carry-out may be generated from only eight particular word patterns, or by a ninth word pattern that includes a carry-in condition, as provided in the rows below the nibbles legend 140. The nibbles $N_7$, ..., $N_0$ in the legend 140, represent four-bit patterns. In the first row, a $T^nG$ nibble pattern as 142 for n=0, 1, 2 or 3 as 144 at nibble $N_7$ may be composed of G###, TG##, TTG# or TTTG, as described in FIG. 5B. In the second row, a $T^4$ nibble pattern as 146 at nibble $N_7$ precedes a $T^nG$ nibble pattern as 148 at nibble $N_6$. In the third row, a pair of $T^4$ nibble patterns may yield a $T^nG$ nibble pattern as 150 at nibble $N_5$. The fourth, fifth, sixth, seventh and eighth rows exhibit a series of $T^4$ nibble patterns preceding the $T^nG$ nibble patterns as 152, 154, 156, 158 and 160, respectively. Detection of any of these word patterns also generates a carry-out as 162 as a logical consequence of "if $T^nG$ is TRUE, then carry-out is unity, else carry-out is zero."

Additionally, all nibbles from $N_7$, ..., $N_0$ having $T^4$ nibble patterns as 164 produces a $T^{32}$ word pattern. This may be more generally described as a $T^m$ word pattern for an m-bit word. Detecting this result signals a carry-out condition provided that a carry-in is unity as 166. This may be described as a logical consequence of "if $T^nG$ is TRUE or if $T^m$ is TRUE and carry-in equals unity, then carry-out equals unity, else carry-out is zero."

This fast carry-out generation technique relies on detecting one of two different nibble patterns within a word of m-bits. The two patterns generating a carry-out include $T^nG$ for n=0, 1, ..., m−1 (whether or not the carry-in equals unity or zero) or $T^m$ only if the carry-in equals unity.

Figure 8:
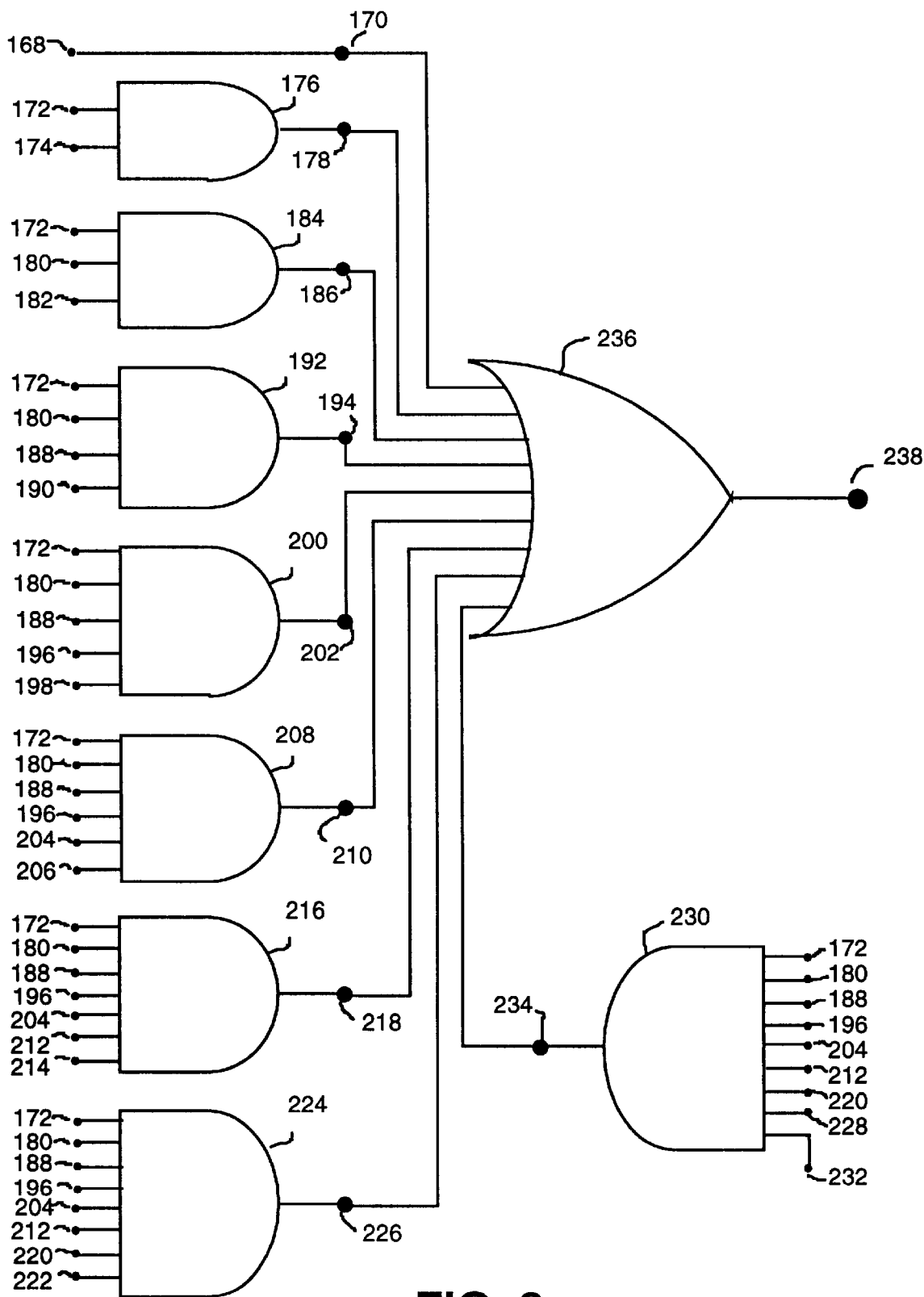
FIG. 8 is a block diagram of four examples featuring 32-bit patterns that generate a carry-out according to a specific embodiment of the present invention.

The combination of nibble patterns as a carry-out generating word result may be combined in the FIG. 8 block diagram. If the highest nibble $N_7$ has a generating nibble pattern of $T^nG_7$ as 168, a carry-out may be generated as 170 irrespective of the lower nibble results, allowing the remaining lower nibbles to be ignored for the purposes of carry-out determination. If nibble $N_7$ has a propagating nibble pattern of $T^4_7$ as 172 combined with nibble $N_6$ having a generating nibble pattern of $T^nG_6$ as 174 in an AND gate 176, the result 178 may also generate a carry-out.

If nibbles $N_7$ and $N_6$ with propagating nibble patterns of $T^4_7$ as 172 and $T^4_6$ as 180 are combined with nibble $N_5$ having a generating nibble pattern of $T^nG_5$ as 182 into an AND gate 184, the result 186 may also generate a carry-out. Similarly, nibbles $N_7$, $N_6$ and $N_5$ may detect $T^4_7$ as 172, $T^4_6$ as 180 and $T^4_5$ as 188 nibble patterns along with nibble $N_4$ with $T^nG_4$ as 190. These nibble patterns may be input into an AND gate 192, to generate a carry-out result 194. This process may continue in corresponding fashion for $T^4$ nibble patterns 172, 180, 188 and 196 for nibbles $N_7$, $N_6$, $N_5$ and $N_4$ respectively, and combined with $T^nG_3$ as 198. These inputs to an AND gate 200 also may generate a carry-out from the result 202.

Propagating nibble patterns 172, 180, 188, 196 and 204 of $T^4$ with generating nibble pattern $T^nG_2$ as 206 may be input to an AND gate 208 to generate a carry-out result 210. Propagating nibble patterns 172, 180, 188, 196, 204 and 212 of $T^4$ with generating nibble pattern $T^nG_1$ as 214 may be input to an AND gate 216 to generate a carry-out result 218. Propagating nibble patterns 172, 180, 188, 196, 204, 212 and 220 of $T^4$ with generating nibble pattern $T^nG_0$ as 222 may be input to an AND gate 224 to generate a carry-out result 226. A fully propagating series of nibble patterns 172, 180, 188, 196, 204, 212, 220 and 228 of $T^4$ from $N_7$, $N_6$, ..., $N_1$, $N_0$, may be input into an AND gate 230 to derive a carry-out if a carry-in 232 is unity producing a carry-out result 234 through the thirty-two-bit word.

The pattern results 170, 178, 186, 194, 202, 210, 218, 226 and 234 from the particular carry-out generating or propagating conditions may be input into an OR gate 236 to detect a carry-out result 238. Only one of these conditions needs to be valid for a carry-out to be generated for the thirty-two-bit word.

Figure 9:
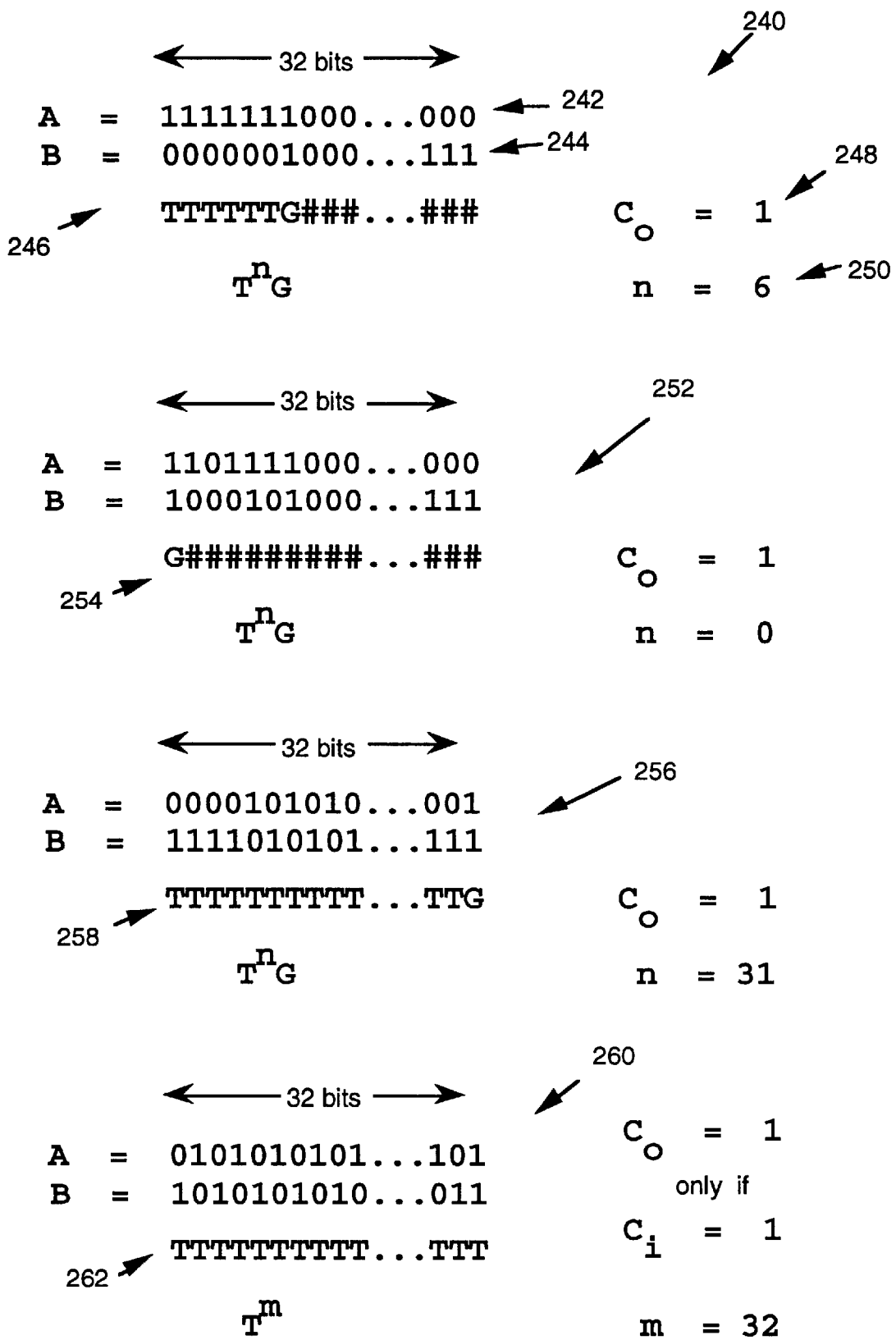
FIG. 9 is a block diagram of the 32-bit patterns generating a carry-out based on four-bit nibble patterns according to a specific embodiment of the present invention.

Examples of carry-out generation patterns for a thirty-two-bit word are shown in FIG. 9. The first example 240 shows augend A as 242 and addend B as 244. The detected word-pattern 246 generates a carry-out as 248 and corresponds to $T^nG$ where n equals six as 250. Divided into four-bit nibbles, this would correspond to nibble $N_7$ having a propagating nibble pattern of $T^4$ and nibble $N_6$ having a transitional nibble pattern of $T^2G$. The # symbols and ellipses following the G bit pattern represent "don't care" patterns that may be ignored since the $T^nG$ detected at the higher registers generates the carry-out.

The second example 252 shows the word-pattern 254 for A and B that generates a carry-out and corresponds to $T^nG$ where n equals zero. Thus, there is no T bit pattern at a higher register to the G bit pattern. Divided into four-bit nibbles, this would correspond to nibble $N_7$ having a transitional nibble pattern of $T^0G$. The # symbols and ellipses following the G bit pattern represent "don't care" patterns that may be ignored since a carry-out can be generated irrespective of these bit patterns.

The third example 256 shows the word-pattern 258 generating a carry-out and corresponds to $T^nG$ where n equals thirty-one. The ellipses represent a continuous string of T bit patterns. Divided into four-bit nibbles, this would correspond to nibbles $N_7$, $N_6$, $N_5$, $N_4$, $N_3$, $N_2$ and $N_1$ having propagating nibble patterns of $T^4$ and nibble $N_0$ having a transitional nibble pattern of $T^3G$. Other arrangements of $T^nG$ for n ranging between zero and thirty-one in a thirty-two-bit word may be contemplated without limiting the scope of the claims.

The fourth example 260 shows the word-pattern 262 of $T^m$ where m equals thirty-two for word length. Divided into four-bit nibbles, this would correspond to nibbles $N_7$, $N_6$, $N_5$, $N_4$, $N_3$, $N_2$, $N_1$ and $N_0$ having propagating nibble patterns of $T^4$. The word-pattern $T^m$ generates a carry-out only if a carry-in equals unity.

The logical operands for comparing the bit pattern produced by an augend and an addend at each register by sequenced AND gates and/or OR gates may preferably be performed in hardware through wired logic circuits. This arrangement takes advantage of the reduced instructed process time by directly bypassing the adder operation. Alternatively, these logical operands may also be coded in software for pattern recognition, such as in Verilog hardware development language.

While embodiments and applications of this invention have been shown and described, it would be apparent to those skilled in the art having the benefit of this application that many more modifications than mentioned above are possible without departing from the inventive concepts herein. The invention, therefore, is not to be restricted except in the spirit of the appended claims.

What is claimed is:

1. A carry-out generator for generating a carry-out signal based on a first binary value and a second binary value, said carry-out generator comprising:

a first receiver having as an input the first binary value;

a second receiver having as an input the second binary value;

a pattern generator coupled to said first receiver and said second receiver for generating an output pattern responsive to said first binary value and said second binary value, said output pattern comprising at least one T and/or G, wherein T represents one of either a 1/0 pair or a 0/1 pair, and wherein G represents a 1/1 pair;

a pattern register coupled to said pattern generator, said pattern register storing said generated output pattern;

a pattern comparer coupled to said pattern register for comparing said output pattern to a predetermined set of patterns, each element in said predetermined set of patterns having a corresponding carry-out state, said pattern comparer outputting said corresponding carry-out state in response to an input pattern within said predetermined set of patterns that matches said output pattern;

and a carry-out signaler for generating a carry-out signal in accordance with said carry-out state output by said pattern comparer.

2. A carry-out generator according to claim 1 wherein said pattern comparer is a look-up table addressable by said input pattern.

3. A carry-out generator according to claim 1 wherein said carry-out state is one of either a positive carry-out state or a negative carry-out state.

4. A carry-out generator according to claim 3 wherein said predetermined set of patterns consists of a $T^nG$ pattern and to a $T^m$ pattern, wherein said output pattern conforms to said $T^nG$ pattern corresponds to said positive carry-out state, wherein said output pattern conforms to said $T^m$ pattern combined with a carry-in condition corresponds to said positive carry-out state, wherein said $T^m$ pattern has an m plurality of T bit patterns, wherein said $T^nG$ pattern has an n plurality of T bit patterns followed by a G bit pattern, wherein n can range from 0, . . . , m−1, wherein T represents one of either a 1/0 pair or a 0/1 pair, wherein G represents a 1/1 pair.

5. A method for generating a carry-out signal based on a first binary value and a second binary value, said method comprising:

receiving the first binary value;

receiving the second binary value;

generating an output pattern for said first binary value and said second binary value, said output pattern comprising at least one T and/or G, wherein T represents one of either a 1/0 pair or a 0/1 pair, and wherein G represents a 1/1 pair;

storing said generated output pattern in a pattern register;

comparing said output pattern in said pattern register to a predetermined set of patterns, each element in said predetermined set of patterns having a corresponding carry-out state, said pattern comparer outputting said corresponding carry-out state in response to an input pattern within said predetermined set of patterns that matches said output pattern; and generating a carry-out signal in accordance with said carry-out state output by said pattern comparer.

6. A method according to claim 5 wherein said comparing further comprises addressing a look-up table by said input pattern.

7. A method according to claim 5 wherein said generating a carry-out signal corresponds to carry-out state being a positive carry-out state rather than a negative carry-out state.

8. A programmable storage device readable by a machine tangibly embodying a program of instructions executable by the machine to perform method steps for generating a carry-out signal based on a first binary value and a second binary value, said method steps comprising:

receiving the first binary value;

receiving the second binary value;

generating an output pattern for said first binary value and said second binary value, said output pattern comprising at least one T and/or G, wherein T represents one of either a 1/0 pair or a 0/1 pair, and wherein G represents a 1/1 pair;

storing said generated output pattern in a pattern register;

comparing said output pattern in said pattern register to a predetermined set of patterns, each element in said predetermined set of patterns having a corresponding carry-out state, said pattern comparer outputting said corresponding carry-out state in response to an input pattern within said predetermined set of patterns that matches said output pattern; and generating a carry-out signal in accordance with said carry-out state output by said pattern comparer.

9. A programmable storage device according to claim 8 wherein said comparing further comprises addressing a look-up table by said input pattern.

10. A programmable storage device according to claim 8 wherein said generating a carry-out signal corresponds to carry-out state being a positive carry-out state rather than a negative carry-out state.

11. A carry-out generator for generating a carry-out signal based on a first binary value and a second binary value, said carry-out generator comprising:

a pattern reader having as an input the first binary value and the second binary value and having as an output a pattern of an m plurality of registers starting at a most significant register, said pattern of an m plurality of registers comprising at least one T and/or G, wherein T represents one of either a 1/0 pair or a 0/1 pair, and wherein G represents a 1/1 pair;

a pattern comparer for comparing said pattern to a $T^nG$ pattern and to a $T^m$ pattern, wherein if said pattern conforms to said $T^nG$ pattern a carry-out condition is produced, wherein if said pattern conforms to said $T^m$ pattern combined with a carry-in condition a carry-out condition is produced, wherein said $T^m$ pattern has an m plurality of T bit patterns, wherein said $T^nG$ pattern has an n plurality of T bit patterns followed by a G bit pattern, wherein n can range from 0, . . . , m−1, wherein T represents one of either a 1/0 pair or a 0/1 pair, wherein G represents a 1/1 pair; and a carry-out signaler for generating the carry-out signal if said carry-out condition is produced.

12. A carry-out generator according to claim 11 wherein said m plurality of registers is subdivided into one or more four-bit nibbles.

13. A carry-out generator according to claim 11 wherein said pattern comparer is a look-up table addressable by said input pattern.

14. A carry-out generator according to claim 11 wherein said pattern reader further comprises:

an AND gate for producing a first bit pattern at a first bit register from the first binary value and the second binary value, wherein said AND gate yields a G bit pattern if said first bit pattern is a 1/1 pair; and an XOR gate for producing a second bit pattern at a second bit register from the first binary value and the second binary value, wherein said XOR gate yields a T bit pattern of unity for said second bit register, if said second bit pattern is one of either a 1/0 pair or a 0/1 pair.

15. A carry-out generator according to claim 11 wherein said pattern reader further comprises:

a first AND gate for producing a first bit pattern at a first bit register from the first binary value and the second binary value, wherein said AND gate yields a G bit pattern if said first bit pattern is a 1/1 pair;

an XOR gate for producing a second bit pattern at a second bit register from the first binary value and the second binary value, wherein said XOR gate yields a T bit pattern of unity for said second bit register, if said second bit pattern is one of either a 1/0 pair or a 0/1 pair;

a second AND gate for producing the pattern from said first bit pattern and said second bit pattern;

and wherein said pattern comparer further comprises:

an OR gate for producing said carry-out condition if the pattern matches one of either said $T^nG$ pattern or said $T^m$ pattern combined with a carry-in condition.

16. A carry-out generator according to claim 11 wherein said pattern reader further comprises:

a first AND gate for producing a first bit pattern at a first bit register from the first binary value and the second binary value, wherein said AND gate yields a G bit pattern if said first bit pattern is a 1/1 pair;

a first XOR gate for producing a second bit pattern at a second bit register from the first binary value and the second binary value, wherein said first XOR gate yields a T bit pattern of unity for said second bit register, if said second bit pattern is one of either a 1/0 pair or a 0/1 pair;

a second AND gate for producing the pattern from said first bit pattern and said second bit pattern;

and wherein said pattern comparer further comprises:

a second XOR gate for producing said carry-out condition if the pattern matches one of either said T"G pattern or said T'" pattern combined with a carry-in condition.

17. A method for generating a carry-out signal based on a first binary value and a second binary value, said method comprising:

reading a bit pattern from the first binary value and the second binary value to produce a pattern of an m plurality of registers starting at a most significant register, said pattern of an m plurality of registers comprising at least one T and/or G, wherein T represents one of either a 1/0 pair or a 0/1 pair, and wherein G represents a 1/1 pair;

comparing said pattern to a T"G pattern and to a T'" pattern, wherein if said pattern conforms to said T"G pattern a carry-out condition is produced, wherein if said pattern conforms to said T'" pattern combined with a carry-in condition a carry-out condition is produced, wherein said T'" pattern has an m plurality of T bit patterns, wherein said T"G pattern has an n plurality of T bit patterns followed by a G bit pattern, wherein n can range from 0, . . . , m−1, wherein T represents one of either a 1/0 pair or a 0/1 pair, wherein G represents a 1/1 pair; and generating the carry-out signal if said carry-out condition is produced.

18. A carry-out generator according to claim 17 wherein said m plurality of registers is subdivided into one or more four-bit nibbles.

19. A method according to claim 17 wherein said method is performed as a series of hardware instructions.

20. A method according to claim 17 wherein said method is performed as a series of software instructions in Verilog hardware development language.

21. A method according to claim 17 wherein said comparing said pattern further comprises addressing a look-up table for recognizing said T"G pattern and said T'" pattern.

22. A programmable storage device readable by a machine tangibly embodying a program of instructions executable by the machine to perform method steps for generating a carry-out signal based on a first binary value and a second binary value, said method steps comprising:

reading a bit pattern from the first binary value and the second binary value to produce a pattern of an m plurality of registers starting at a most significant register, said pattern of an m plurality of registers comprising at least one T and/or G, wherein T represents one of either a 1/0 pair or a 0/1 pair, and wherein G represents a 1/1 pair;

comparing said pattern to a T"G pattern and to a T'" pattern, wherein if said pattern conforms to said T"G pattern a carry-out condition is produced, wherein if said pattern conforms to said T'" pattern combined with a carry-in condition a carry-out condition is produced, wherein said T'" pattern has an m plurality of T bit patterns, wherein said T"G pattern has an n plurality of T bit patterns followed by a G bit pattern, wherein n can range from 0, . . . , m−1, wherein T represents one of either a 1/0 pair or a 0/1 pair, wherein G represents a 1/1 pair; and generating the carry-out signal if said carry-out condition is produced.

23. A programmable storage device according to claim 22 wherein said m plurality of registers is subdivided into one or more four-bit nibbles.

24. A programmable storage device according to claim 22 wherein said method steps are performed as a series of software instructions in Verilog hardware development language.

25. A programmable storage device according to claim 22 wherein said comparing said pattern further comprises addressing a look-up table for recognizing said T"G pattern and said T'" pattern.

26. A carry-out generator for generating a carry-out signal based on a first binary value and a second binary value, said carry-out generator comprising:

a means for reading a bit pattern from the first binary value and the second binary value to produce a pattern of an m plurality of registers starting at a most significant register, said pattern of an m plurality of registers comprising at least one T and/or G, wherein T represents one of either a 1/0 pair or a 0/1 pair, and wherein G represents a 1/1 pair;

a means for comparing said pattern to a T"G pattern and to a T'" pattern, wherein if said pattern conforms to said T"G pattern a carry-out condition is produced, wherein if said pattern conforms to said T'" pattern combined with a carry-in condition a carry-out condition is produced, wherein said T'" pattern has an m plurality of T bit patterns, wherein said T"G pattern has an n plurality of T bit patterns followed by a G bit pattern, wherein n can range from 0, . . . , m−1, wherein T represents one of either a 1/0 pair or a 0/1 pair, wherein G represents a 1/1 pair; and a means for generating the carry-out signal if said carry-out condition is produced.

27. A carry-out generator according to claim 26 wherein said m plurality of registers is subdivided into one or more four-bit nibbles.

28. A carry-out generator for generating a carry-out signal based on a first binary value and a second binary value, said carry-out generator comprising:

a means for receiving the first binary value;

a means for receiving the second binary value;

a means for generating an output pattern generator to said first binary value and said second binary value, said output pattern comprising at least one T and/or G, wherein T represents one of either a 1/0 pair or a 0/1 pair, and wherein G represents a 1/1 pair;

a means for storing said generated output pattern in a pattern register;

a means for comparing said output pattern in said pattern register to a predetermined set of patterns, each element in said predetermined set of patterns having a corresponding carry-out state, said pattern comparer outputting said corresponding carry-out state in response to an input pattern within said predetermined set of patterns that matches said output pattern; and a means for generating a carry-out signal in accordance with said carry-out state output by said pattern comparer.

29. A carry-out generator according to claim 27 wherein said means for comparing further comprises means for addressing a look-up table by said input pattern.

30. A carry-out generator according to claim 27 wherein said means for generating a carry-out signal corresponds to carry-out state being a positive carry-out state rather than a negative carry-out state.

* * * * *